US012671248B2

(12) United States Patent
Melack

(10) Patent No.: US 12,671,248 B2
(45) Date of Patent: Jun. 30, 2026

(54) SYSTEMS AND METHODS FOR POWER DISTRIBUTION IN ELECTRIC AIRCRAFT

(71) Applicant: Archer Aviation Inc., San Jose, CA (US)

(72) Inventor: John Melack, Redwood City, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/930,056

(22) Filed: Oct. 29, 2024

(65) Prior Publication Data

US 2025/0187738 A1     Jun. 12, 2025

Related U.S. Application Data

(63) Continuation of application No. 18/593,702, filed on Mar. 1, 2024, now Pat. No. 12,162,614, which is a
(Continued)

(51) Int. Cl.
*H02J 1/10* (2026.01)
*B64C 29/00* (2006.01)
(Continued)

(52) U.S. Cl.
CPC ............ *H02J 1/10* (2013.01); *B64C 29/0033* (2013.01); *B64D 27/24* (2013.01); *B64D 27/31* (2024.01);
(Continued)

(58) Field of Classification Search
None
See application file for complete search history.

(56) References Cited

U.S. PATENT DOCUMENTS 5,612,579 A     3/1997   Wisbey et al.
6,344,700 B1    2/2002   Eisenhaur et al.
(Continued)

FOREIGN PATENT DOCUMENTS

CN          110667836 A      1/2020
DE       102018129211 A1     5/2020
(Continued)

OTHER PUBLICATIONS

Bower et al., U.S. Appl. No. 16/923,939, filed Jul. 8, 2020 for "Systems and Methods for Power Distribution in Electric Aircraft." [A copy is not submitted herewith pursuant to the waiver of 37 C.F.R. § I .98(a)(2)(iii) issued by the Office on Sep. 21, 2004.].
(Continued)

*Primary Examiner* — Menatoallah Youssef
*Assistant Examiner* — Aqeel H Bukhari
(74) *Attorney, Agent, or Firm* — Finnegan, Henderson, Farabow, Garrett & Dunner, LLP

(57)                  ABSTRACT

A electric aircraft power distribution system includes a first battery pack connected to at least a first load and to a common bus that connects the first battery pack in parallel to at least a second battery pack; a first electrical component electrically connected between the first battery pack and the first load and configured to disconnect the first load from the first battery pack in response to current above a first threshold current, wherein the first electrical component has a first disconnection time at the first threshold current; and a second electrical component electrically connected between the first battery pack and the common bus and configured to disconnect the first battery pack from the common bus in response to current above a second threshold current, wherein the second electrical component has a second disconnection time at the second threshold current that is higher than the first disconnection time.

32 Claims, 12 Drawing Sheets

Related U.S. Application Data continuation of application No. 18/357,055, filed on Jul. 21, 2023, now Pat. No. 11,945,594, which is a continuation of application No. 17/937,936, filed on Oct. 4, 2022, now Pat. No. 11,745,883, which is a continuation of application No. 17/115,119, filed on Dec. 8, 2020, now Pat. No. 11,465,764.

(51) Int. Cl.

| | |
|---|---|
| *B64D 27/24* | (2024.01) |
| *B64D 27/31* | (2024.01) |
| *B64D 27/34* | (2024.01) |
| *B64D 27/357* | (2024.01) |

(52) U.S. Cl.

CPC ........... *B64D 27/34* (2024.01); *B64D 27/357* (2024.01); *B64D 2221/00* (2013.01)

(56) References Cited

U.S. PATENT DOCUMENTS

| | | | |
|---|---|---|---|
| 8,129,951 B2 | 3/2012 | Turner et al. | |
| 8,174,238 B2 | 5/2012 | Badger | |
| 8,487,558 B2 | 7/2013 | Ogawa et al. | |
| 8,552,686 B2 | 10/2013 | Jung et al. | |
| 9,493,090 B2 | 11/2016 | Timmons et al. | |
| 9,601,812 B2 | 3/2017 | Namou et al. | |
| 9,616,766 B2 | 4/2017 | Fujii | |
| 9,713,961 B2 | 7/2017 | Fan et al. | |
| 9,783,037 B2 | 10/2017 | Muto et al. | |
| 10,128,674 B2 | 11/2018 | Nelson | |
| 10,179,519 B2 | 1/2019 | Schmidt | |
| 12,126,165 B2 | 10/2024 | Culpin | |
| 2011/0222200 A1 | 9/2011 | Fuller et al. | |
| 2014/0330463 A1 | 11/2014 | Jeong | |
| 2016/0236790 A1 | 8/2016 | Knapp et al. | |
| 2018/0105268 A1 | 4/2018 | Tighe et al. | |
| 2018/0134400 A1 | 5/2018 | Knapp et al. | |
| 2018/0215465 A1 | 8/2018 | Renteria | |
| 2018/0290746 A1 | 10/2018 | Hanna et al. | |
| 2019/0092257 A1 | 3/2019 | Boecker et al. | |
| 2019/0135424 A1 | 5/2019 | Baity et al. | |
| 2019/0229541 A1 | 7/2019 | Ono | |
| 2019/0255967 A1 | 8/2019 | Doersam et al. | |
| 2019/0288521 A1 | 9/2019 | Wilhide et al. | |
| 2020/0001996 A1 | 1/2020 | Mcadoo | |
| 2020/0010187 A1* | 1/2020 | Bevirt ................. | B64C 29/0033 |
| 2020/0164995 A1 | 5/2020 | Lovering et al. | |
| 2020/0324908 A1 | 10/2020 | Wortmann | |
| 2020/0346769 A1 | 11/2020 | Knapp et al. | |
| 2021/0206499 A1 | 7/2021 | Balachandran et al. | |
| 2021/0253234 A1 | 8/2021 | Tao et al. | |
| 2022/0009625 A1 | 1/2022 | Bower et al. | |
| 2022/0127011 A1* | 4/2022 | Long ..................... | B60L 3/0092 |

FOREIGN PATENT DOCUMENTS

| | | |
|---|---|---|
| EP | 3303124 A1 | 12/2016 |
| EP | 3624301 A1 | 3/2020 |
| GB | 2569659 A | 6/2019 |
| JP | 2010-183671 A1 | 8/2010 |
| JP | 2016539609 A | 12/2016 |
| JP | 2020036527 A | 10/2023 |
| WO | 2012/133706 A1 | 10/2012 |
| WO | 2015/138217 A1 | 9/2015 |
| WO | 2016/189797 A1 | 12/2016 |
| WO | 2019/006469 A1 | 1/2019 |
| WO | 2019/041383 A1 | 3/2019 |
| WO | 2019/145777 A1 | 8/2019 |
| WO | 2020/058706 A1 | 3/2020 |

OTHER PUBLICATIONS

International Search Report and Written Opinion mailed Oct. 25, 2021, directed to International Application No. PCT/US2021/040619; 12 pages.

Marius, U.S. Appl. No. 17/156,047, filed Jan. 22, 2021 for "Systems and Methods for Power Distribution in Electric Aircraft." [A copy is not submitted herewith pursuant to the waiver of 37 C.F.R. § I .98(a)(2)(iii) issued by the Office on Sep. 21, 2004.].

International Search Report and Written Opinion mailed Apr. 13, 2022, directed to International Application No. PCT/US2022/070282; 12 pages.

International Search Report and Written Opinion mailed Apr. 8, 2022, directed to International Application No. PCT/US2021/072776; 10 pages.

Marius, U.S. Office Action dated Jan. 26, 2022, directed to U.S. Appl. No. 17/156,047; 12 pages.

Examination Report issued by the European Patent Office for European Application No. 21840392.1, dated Jul. 30, 2024; 11 pages.

Examination Report issued by the European Patent Office for European Application No. 21749442.6, dated Jul. 26, 2024; 11 pages.

Examination Report issued by the Australian Patent Office for Australian Application No. 2021395024, dated Sep. 12, 2024; 3 pages.

Office Action issued by Japanese Patent Office for Japanese Application No. 2023-501385, dated Nov. 12, 2024; 4 pages.

Office Action issued by Japanese Patent Office for Japanese Application No. 2023-558665, dated Nov. 12, 2024; 4 pages.

* cited by examiner

SYSTEMS AND METHODS FOR POWER DISTRIBUTION IN ELECTRIC AIRCRAFT

CROSS-REFERENCE TO RELATED APPLICATION

This application is a continuation of U.S. application Ser. No. 18/593,702, filed Mar. 1, 2024, and issued as U.S. Pat. No. 12,162,614 on Dec. 10, 2024, which is a continuation of U.S. application Ser. No. 18/357,055, filed Jul. 21, 2023, and issued as U.S. Pat. No. 11,945,594 on Apr. 2, 2024, which is a continuation of U.S. application Ser. No. 17/937,936, filed Oct. 4, 2022, and issued as U.S. Pat. No. 11,745,883 on Sep. 5, 2023, which is a continuation of U.S. application Ser. No. 17/115,119, filed Dec. 8, 2020, and issued as U.S. Pat. No. 11,465,764 on Oct. 11, 2022. The entire contents of all of the foregoing are incorporated herein by reference.

FIELD

The field of the present invention relates generally to electric aircraft, and more specifically to electric power distribution for electric aircraft.

BACKGROUND

Progress in battery technology has enabled battery power densities suitable for powering lightweight, electric aircraft. Electric power systems for electric aircraft, particularly passenger aircraft, must be safe while at the same time being both light and efficient. Safety considerations can sometimes be at odds with the goals of reduced weight and high efficiency. For example, conventional power distribution systems often employ multiple battery packs and redundancies within the power distribution system to ensure that there is no single point of failure but this redundancy increases inefficiencies and adds weight. Balancing safety and aircraft weight and efficiency concerns poses a challenge for designing electric aircraft.

SUMMARY

According to various embodiments, a power distribution system for an electric aircraft includes a first battery pack connected to a load for powering the load and to a second battery pack via a common bus for load sharing with the second battery pack. A first electrical disconnection device, such as a fuse, is electrically positioned between the first battery pack and the load, and a second electric disconnection device is electrically positioned between the first battery pack and the common bus. The first electrical disconnection device is faster acting than the second electrical disconnection device, such as by having a shorter opening time at its rated current than the second electrical disconnection device. In the event of an overcurrent fault event in the electrical circuit from the first battery pack to the first load, the first disconnection device disconnects the connection between the first battery pack and the load while the second disconnection device does not disconnect, such as due to its slower acting configuration. Thus, the first battery can be protected from the fault at the load or distribution between the battery and load while continuing to share its power with the second battery pack. In the event of an overcurrent fault event on the common bus, the second disconnection device will protect the first battery pack by disconnecting the first battery pack from the common bus so that the first battery pack can continue to provide power to the load. By providing a common bus with the electrical disconnection devices, power can be shared between batteries while ensuring that the common bus is not a single point of failure.

According to various embodiments, a power distribution system for an electric aircraft includes a first battery pack connected to at least a first load and to a common bus that connects the first battery pack in parallel to at least a second battery pack, a first electrical component electrically connected between the first battery pack and the first load and configured to disconnect the first load from the first battery pack in response to current above a first threshold current, wherein the first electrical component has a first disconnection time at the first threshold current, and a second electrical component electrically connected between the first battery pack and the common bus and configured to disconnect the first battery pack from the common bus in response to current above a second threshold current, wherein the second electrical component has a second disconnection time at the second threshold current that is higher than the first disconnection time.

In any of these embodiments, the first threshold current may be less than the second threshold current.

In any of these embodiments, the first battery pack may be electrically connected to a second load and a third electrical component may be electrically connected between the first battery pack and the second load and may have a third disconnection time at a third threshold current and the third disconnection time may be lower than the second disconnection time.

In any of these embodiments, the third disconnection time may be equal to the first disconnection time.

In any of these embodiments, the second battery pack may be connected to at least a second load, a third electrical component may be electrically connected between the second battery pack and the second load and configured to disconnect the second load from the second battery pack in response to current above a third threshold current, wherein the third electrical component may have a third disconnection time at the third threshold current, and a fourth electrical component may be electrically connected between the first battery pack and the common bus and configured to disconnect the second battery pack from the common bus in response to current above a fourth threshold current, wherein the fourth electrical component may have a fourth disconnection time at the fourth threshold current that is higher than the third disconnection time.

In any of these embodiments, at least one of the first electrical component and the second electrical components may be a fuse.

In any of these embodiments, the fuse may be an explosive fuse, a thermal fuse, or a magnetic fuse.

In any of these embodiments, the common bus may connect positive terminals of the first and second battery packs.

In any of these embodiments, electrical circuitry from the first battery pack to the first load and from the first battery pack to the common bus may be free of any diode.

In any of these embodiments, the first load may be an electric propulsion unit. In any of these embodiments, the electric propulsion unit may include a propeller.

In any of these embodiments, the first battery pack may include a plurality of batteries arranged in series, parallel, or a combination of series and parallel.

In any of these embodiments, the first battery pack may be configured to generate greater than 100 volts.

In any of these embodiments, an electric power of the first load may be at least 10 kilowatts.

In any of these embodiments, the system may include a third electrical component for selectively disconnecting the first battery pack from the first load or from the common bus. In any of these embodiments, the third electrical component can be electrically positioned between the first battery pack and the first electrical component or the second electrical component.

According to various embodiments, an electric aircraft can include and of the power distribution systems above. In any of these embodiments, the aircraft may be manned. In any of these embodiments, the aircraft may be a vertical take-off and landing aircraft.

According to various embodiments, a method for distributing power in an electric aircraft includes providing power from a first battery pack to a first load, wherein the first battery pack is connected to a common bus that connects the first battery pack in parallel to at least a second battery pack, a first electrical component is electrically connected between the first battery pack and the first load and configured to disconnect the first load from the first battery pack in response to current above a first threshold, and a second electrical component electrically connected between the first battery pack and the common bus and configured to disconnect the first battery pack from the common bus in response to current above a second threshold, wherein the second threshold is higher than the first threshold.

In any of these embodiments, the first threshold current may be less than the second threshold current.

In any of these embodiments, the first battery pack may be electrically connected to a second load and a third electrical component may be electrically connected between the first battery pack and the second load and may have a third disconnection time at a third threshold current and the third disconnection time may be lower than the second disconnection time.

In any of these embodiments, the third disconnection time may be equal to the first disconnection time.

In any of these embodiments, the second battery pack may be connected to at least a second load, a third electrical component may be electrically connected between the second battery pack and the second load and configured to disconnect the second load from the second battery pack in response to current above a third threshold current, wherein the third electrical component may have a third disconnection time at the third threshold current, and a fourth electrical component may be electrically connected between the first battery pack and the common bus and configured to disconnect the second battery pack from the common bus in response to current above a fourth threshold current, wherein the fourth electrical component may have a fourth disconnection time at the fourth threshold current that is higher than the third disconnection time.

In any of these embodiments, at least one of the first electrical component and the second electrical components may be a fuse.

In any of these embodiments, the fuse may be an explosive fuse, a thermal fuse, or a magnetic fuse.

In any of these embodiments, the common bus may connect positive terminals of the first and second battery packs.

In any of these embodiments, electrical circuitry from the first battery pack to the first load and from the first battery pack to the common bus may be free of any diode.

In any of these embodiments, the first load may be an electric propulsion unit. In any of these embodiments, the electric propulsion unit may include a propeller.

In any of these embodiments, the first battery pack may include a plurality of batteries arranged in series, parallel, or a combination of series and parallel.

In any of these embodiments, the first battery pack may be configured to generate greater than 100 volts.

In any of these embodiments, an electric power of the first load may be at least 10 kilowatts.

In any of these embodiments, the method may further include a third electrical component selectively disconnecting the first battery pack from the first load or from the common bus. In any of these embodiments, the third electrical component can be electrically positioned between the first battery pack and the first electrical component or the second electrical component.

According to various embodiments, the method may be performed by an electric aircraft. In any of these embodiments, the aircraft may be manned. In any of these embodiments, the aircraft may be a vertical take-off and landing aircraft.

BRIEF DESCRIPTION OF THE DRAWINGS

The invention will now be described, by way of example only, with reference to the accompanying drawings, in which.

DETAILED DESCRIPTION

Figure 1A:
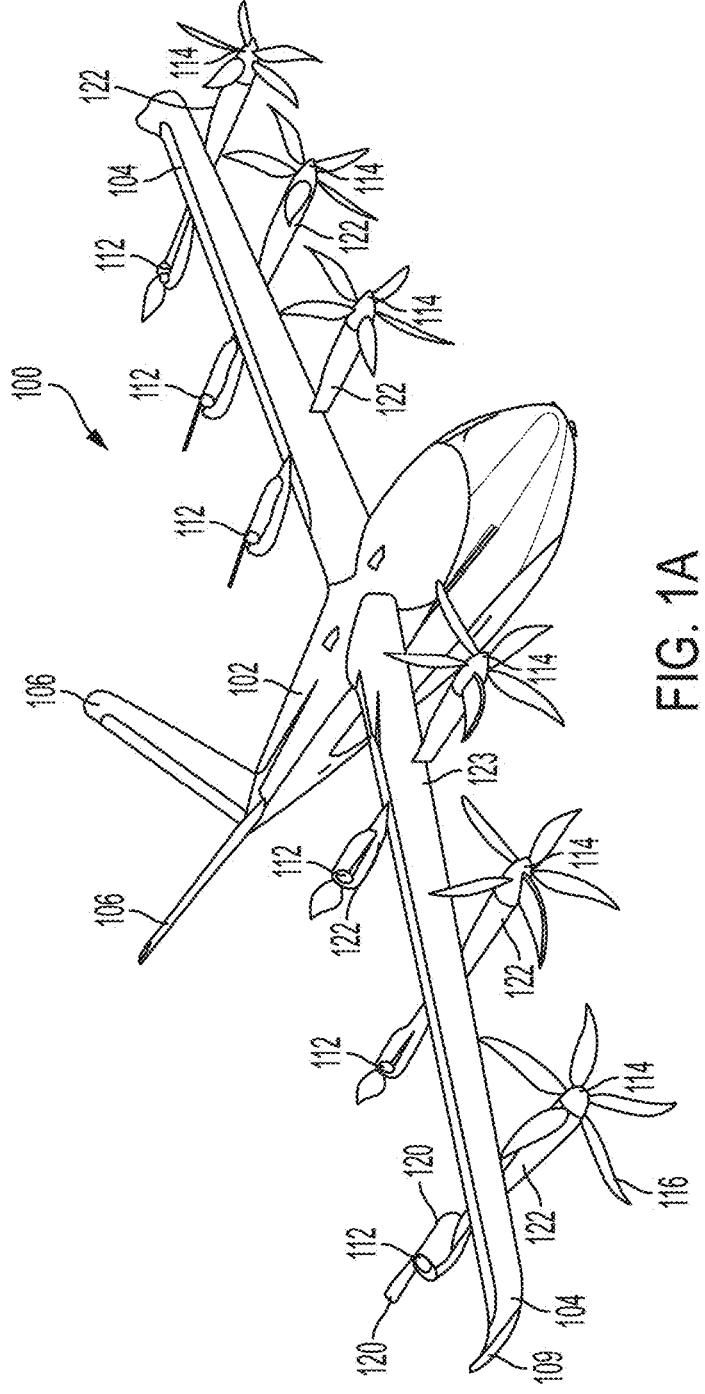
FIG. 1A shows a VTOL aircraft in a forward flight configuration, according to various embodiments.

According to various embodiments, systems and methods for power distribution in an electric aircraft include powering a plurality of loads of the aircraft with a plurality of battery packs that each are connected to a different portion of the loads using different power distribution buses. For example, a first battery pack is connected to a first portion the loads using a first power distribution bus and a second battery pack is connected to a second portion of the loads using a second power distribution bus. At least some of the battery packs are electrically connected to one another via a common bus, which enables load sharing amongst the connected battery packs. To protect a battery from an overcurrent fault event in the circuit from the battery to its connected load, a first electrical disconnection device, such as a fuse, is electrically positioned between the battery and its connected load. To protect the battery from an overcurrent fault event involving the common bus, a second electrical disconnection device is electrically positioned between the battery and the common bus. The first electrical disconnection device is faster acting than the second disconnection device so that an overcurrent event at the load does not cause the battery to be disconnected from the common bus, ensuring that the battery can continue to be interconnected with one or more additional batteries. Interconnecting the batteries enables load sharing, which can have the design advantage of smaller batteries and, thus, weight savings, while the combination of electrical disconnections devices ensures that there is no single point of failure. According to various embodiments, this can be achieved without diodes and/or without redundant buses, which provides weight savings.

According to various embodiments, the plurality of loads include electric propulsion units (EPUs). According to various embodiments the EPUs include rotors that are configured for providing lift to the aircraft, such as during vertical take-off and landing and during hover, and can be deactivated during cruise, and proprotors that can provide lift to the aircraft and tilt forward to provide forward thrust to the aircraft for forward flight, with lift being provided by one or more wings of the aircraft. According to various embodiments, each battery pack powers one EPU. According to various embodiments, each battery pack powers multiple EPUs. According to various embodiments, each battery pack powers at least a portion of at least one rotor and at least a portion of at least one proprotor so that in case the battery pack or its power distribution bus becomes disabled during forward flight, only the power from the at least a portion of at least one proprotor is lost. The other EPU(s) powered by the lost battery pack—the rotor(s)—don't contribute to the forward power, so their loss does not affect the forward flight. The remaining proprotor portions (those powered by other battery packs) can continue operating, with adjustment of control surfaces and/or adjustment of power from the remaining proprotor portions compensating for the lost proprotor portions. Thus, effects of the loss of a battery pack to forward flight can be minimized while still providing fault tolerance without increased weight associated with diodes and/or redundant power distribution buses. According to various embodiments, each battery pack powers the equivalent of one proprotor (in addition to some proportion of the rotors) such that the forward power loss for forward flight resulting from the loss of a battery pack is only the equivalent of the power from one proprotor.

According to various embodiments, a single common bus interconnects all battery packs that power EPUs. According to various embodiments, a first set of battery packs is interconnected via a first common bus and a second set of battery packs is interconnected via a second common bus. According to various embodiments, the first set of battery packs are different in type and/or number than the second set of battery packs. According to various embodiments, the first set of battery packs powers rotors and the second set of battery packs powers proprotors.

According to various embodiments, the aircraft is an electric vertical take-off and landing (VTOL or eVTOL) aircraft, which can take-off and land vertically and hover, providing the ability to carry travelers closer to their destination than would be the case when using aircraft that require a runway. According to various embodiments, the aircraft is a fixed wing eVTOL.

According to various embodiments, the EPUs that are driven by a given battery pack are selected to reduce destabilization effects caused by a loss of power to the EPUs should the battery pack fail. EPUs that are arranged on opposite sides of one or more axes of symmetry of the collection of EPUs can be powered by the same battery pack to reduce the roll, pitch, or yaw moments that may be caused by the loss of power to the EPUs driven by the battery pack. For example, EPUs in the same relative position on either side of the longitudinal axis of the aircraft may be driven by a first battery pack so that, should one of the battery packs fail, minimal roll moments will occur because the thrust provided by the remaining EPUs will still be uniform about the longitudinal axis. Similarly, in some embodiments, EPUs are arranged forward and rearward of a set of wings and EPUs on opposite sides of the wings and opposite sides of the longitudinal axis may be powered by the same battery pack.

According to various embodiments, the portion of EPUs powered by a battery pack can include a portion of a single EPU motor such that one portion of an EPU motor is powered by a first battery pack and another portion of an EPU motor is powered by a second battery pack. For example, an EPU may include two half-motors that can work in unison during normal operation to drive a plurality of blades for providing thrust to the aircraft and one of the half-motors is driven by one battery pack and the other half-motor is driven by another battery pack. In the event of a failure of one of the battery packs, the EPU is still operational at half power. A given battery pack can power partial-motors of different EPUs do that the effects of the loss of a battery pack are shared across multiple EPUs that continue to operate at reduced power.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

As used herein, the term "proprotor" refers to a variable pitch propeller that can provide thrust for vertical lift and for forward propulsion by varying the pitch of the propeller.

As used herein, the term "battery pack" means any combination of electrically connected batteries (i.e., battery cells) and can include a plurality of batteries arranged in series, parallel, or a combination of series and parallel.

Figure 1B:
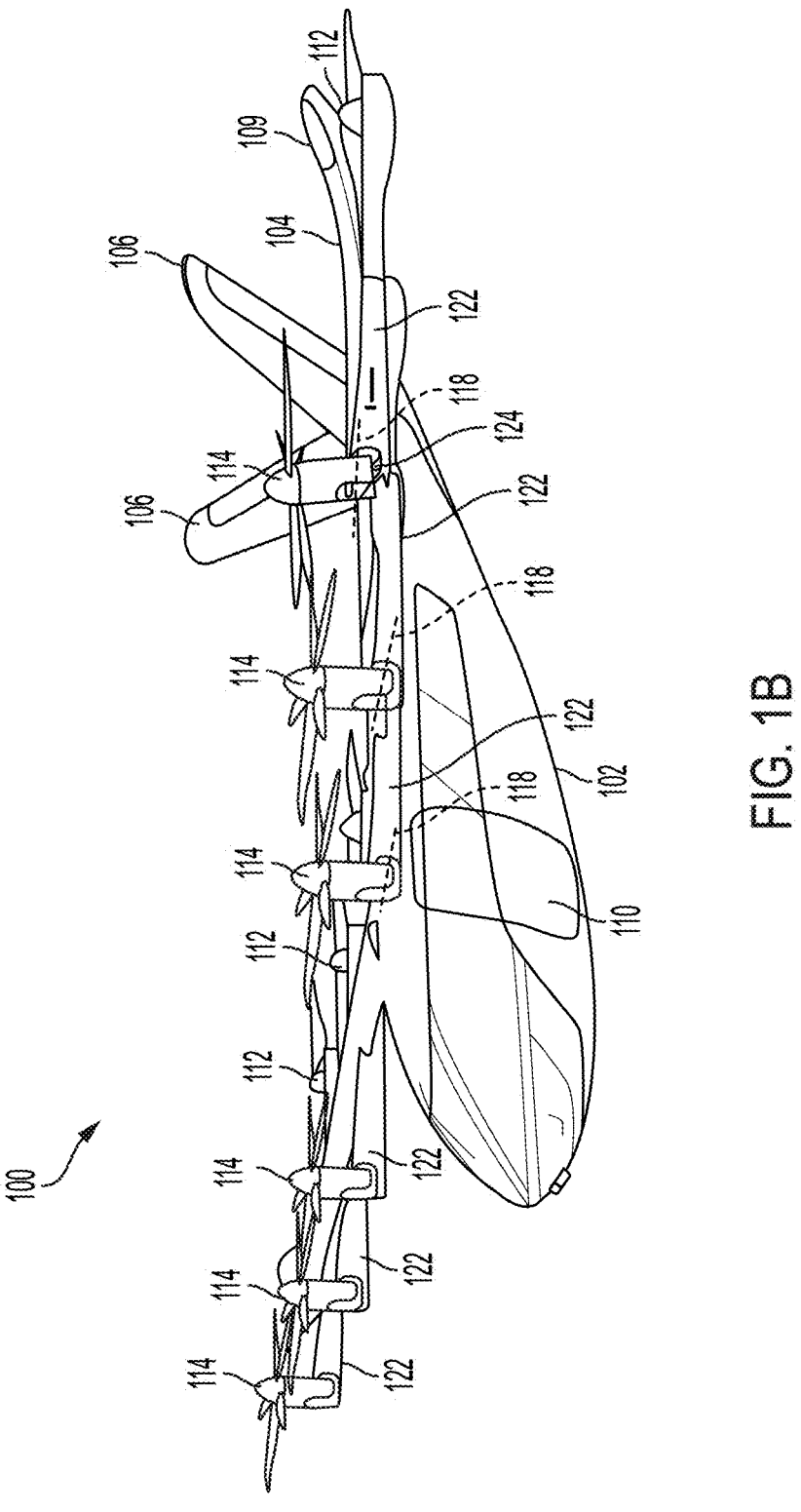
FIG. 1B shows a VTOL aircraft in a takeoff and landing configuration, according to various embodiments.

FIGS. 1A and 1B illustrate a VTOL aircraft 100 in a cruise configuration and a vertical take-off and landing configuration, respectively, according to various embodiments. Exemplary embodiments of a VTOL aircraft according to various embodiments are discussed in U.S. patent application Ser. No. 16/878,380, titled "Vertical Take-Off and Landing Aircraft" and filed May 19, 2020, the entire contents of which are incorporated herein by reference.

The aircraft 100 includes a fuselage 102, wings 104 mounted to the fuselage 102, and one or more rear stabilizers 106 mounted to the rear of the fuselage 102. The aircraft 100 includes a plurality of rotors 112 and a plurality of proprotors 114 (collectively referred to herein as EPUs). The EPUs (112, 114) generally include an electric motor driving a fan (a plurality of blades) and a motor controller for controlling/powering the motor. As discussed further below with respect to FIG. 4, an EPU can include a plurality of partial motors that can independently and together drive the fan and can be controlled by a plurality of separate motor controllers.

Rotors 112 are mounted to the wings 104 and are configured to provide lift for vertical take-off and landing. Proprotors 114 are mounted to the wings 104 and are tiltable between lift configurations in which they provide a portion of the lift required for vertical take-off and landing and hovering, as shown in FIG. 1B, and propulsion configurations in which they provide forward thrust to the aircraft 100 for horizontal flight, as shown in FIG. 1A. As used herein, a proprotor lift configuration refers to any proprotor orientation in which the proprotor thrust is providing primarily lift to the aircraft and a proprotor propulsion configuration refers to any proprotor orientation in which the proprotor thrust is providing primarily forward thrust to the aircraft.

According to various embodiments, the rotors 112 are configured for providing lift only, with all propulsion being provided by the proprotors. Accordingly, the rotors 112 may be in fixed positions. During take-off and landing, the proprotors 114 are tilted to lift configurations in which their thrust is directed downwardly for providing additional lift.

For forward flight, the proprotors 114 tilt from their lift configurations to their propulsion configurations. In other words, the pitch of the proprotors 114 is varied from a pitch in which the proprotor thrust is directed downward to provide lift during vertical take-off and landing and during hover to a pitch in which the proprotor thrust is directed rearward to provide forward thrust to the aircraft 100. The proprotors tilt about axes 118 that are perpendicular to the forward direction of the aircraft 100. When the aircraft 100 is in full forward flight, lift may be provided entirely by the wings 104, and the rotors 112 may be shut-off. The blades 120 of the rotors 112 may be locked in low drags positions for aircraft cruising. In some embodiments, the rotors 112 each have two blades 120 that are locked for cruising in minimum drag positions in which one blade is directly in front of the other blade as illustrated in FIG. 1A. In some embodiments, the rotors 112 have more than two blades. In some embodiments, the proprotors 114 include more blades 116 than the rotors 112. For example, as illustrated in FIGS. 1A and 1B, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and proprotors 114 are mounted to the wings—i.e., no rotors or proprotors are mounted to the fuselage. According to various embodiments, the rotors 112 are all located rearwardly of the wings 104 and the proprotors 114 are all located forward of the wings 104. According to some embodiments, all rotors 112 and proprotors 114 are positioned inwardly of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge 124. The proprotor 114 may be mounted to the boom 122 such that the proprotor 114 is aligned with the body of the boom 122 when in its propulsion configuration, forming a continuous extension of the front end of the boom 122 that minimizes drag for forward flight.

According to various embodiments, the aircraft 100 may include only one wing on each side of the aircraft 100 or a single wing that extends across the aircraft. According to some embodiments, the at least one wing 104 is a high wing mounted to an upper side of the fuselage 102. According to some embodiments, the wings include control surfaces, such as flaps and/or ailerons. According to some embodiments, the wings can have curved wing tips 109 for reduced drag during forward flight.

According to some embodiments, the rear stabilizers 106 include control surfaces, such as one or more rudders, one or more elevators, and/or one or more combined rudder-elevators. The wing(s) may have any suitable design. In some embodiments, the wings have a tapering leading edge 123, as shown for example, in the embodiment of FIG. 1A. In some embodiments, the wings have a tapering trailing edge.

Figure 2A:
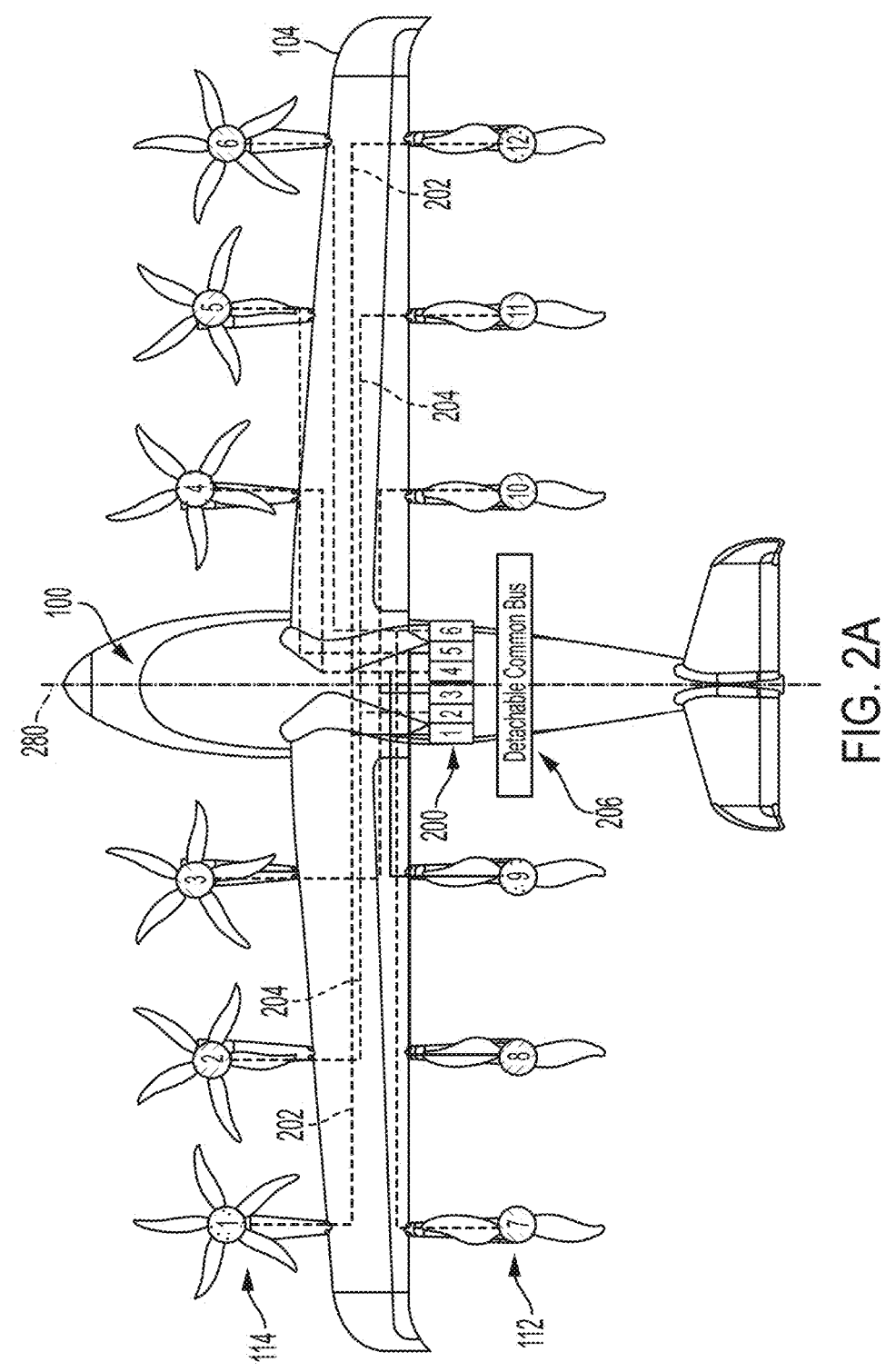
FIGS. 2A and 2B illustrate a power distribution architecture for powering the electric propulsion units of an aircraft in which a plurality of battery packs are detachably connected to a common bus, according to various embodiments.
Figure 2B:
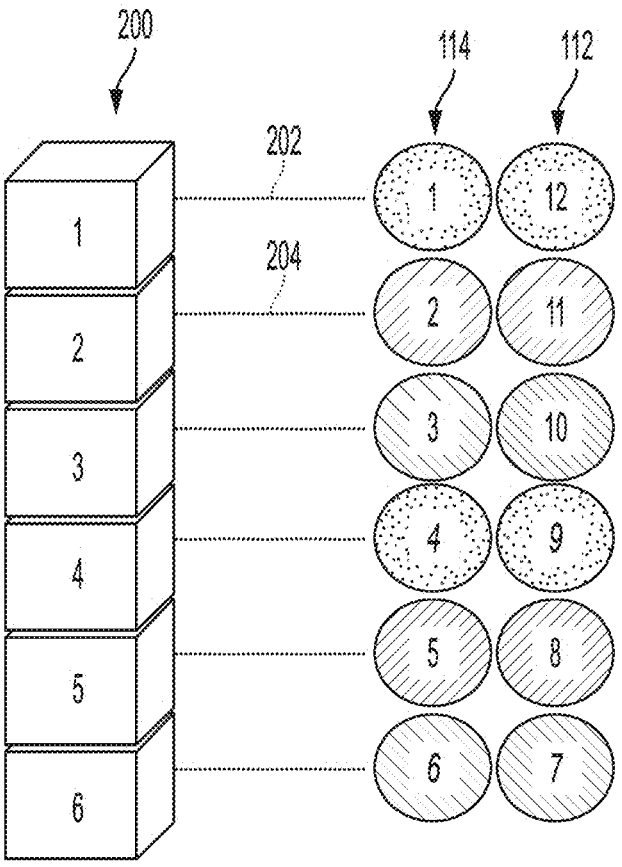

FIG. 2A illustrates a power distribution architecture for powering the EPUs (112, 114) of aircraft 100, according to various embodiments. Although FIGS. 1A-2A illustrate 12 EPUS (numbered 1-12 in FIG. 2A) mounted to wings 104 aircraft according to various embodiments can have any suitable number of EPUs, including four, six, eight, ten, fourteen, eighteen, twenty, or more. The EPUs are powered by a plurality of battery packs 200. In the embodiment illustrated in FIG. 2A, there are six battery packs 200—numbered 1 through 6. Each battery pack 200 powers only a portion of the EPUs. In the illustrated embodiment, each battery pack 200 powers two EPUs. The groupings of battery packs and EPUs according to the embodiment illustrated in FIG. 2A is listed in FIG. 2B. Battery pack 1 powers EPUs 1 and 12, battery pack 2 powers EPUs 2 and 11, and so on. Each battery pack 200 is connected to its respective portion of the EPUs via a dedicated power distribution bus—e.g., bus 202 connecting battery pack 1 to EPU 1 and EPU 12 and bus 204 connecting battery pack 2 to EPU 2 and EPU 11. So, the power distribution bus 202 of one battery pack 1 is not electrically connected to the power distribution bus 204 of battery pack 2.

According to various embodiments, the battery packs 200 are interconnected via a common bus 206 to which the battery packs 200 are each detachably connected. Through the common bus 206, the battery packs can load share, which decreases the maximum power required of a given battery pack. The decreased maximum power requirement can mean smaller batteries, which provides weight savings and/or batteries using lower power higher energy cells, which increases range. As described further below, an electrical disconnection device, such as a fuse, is provided between each battery pack and the common bus so that in the event of an overcurrent fault involving the common bus, the battery packs will be protected by being detached from the common bus by the electrical disconnection device, and can continue to power the EPUs to which they are directly connected. Moreover, according to various embodiments, an electrical failure in one battery pack or its power distribution will not cause failure of the operation of the other EPUs and battery packs. Only the EPUs powered by the failed battery pack or power distribution are affected. Thus, there is no single point of failure in the powering of the aircraft.

According to various embodiments, the particular EPUs that are powered by a given battery pack may be selected to reduce the destabilization effects caused by a loss of power to the EPUs should the battery pack fail. According to various embodiments, EPUs that are arranged on opposite sides of one or more axes of symmetry of the collection of EPUs can be powered by the same battery pack to reduce the roll, pitch, or yaw moments that may be caused by the loss of power to the EPUs driven by the battery pack. For example, EPUs in the same relative position on either side of the longitudinal axis 280 of the aircraft 100 may be driven by a first battery pack so that, should one of the battery packs fail, minimal roll moments will occur because the thrust provided by the remaining EPUs will remain uniform about the longitudinal axis. Similarly, in some embodiments, a set of EPUs are arranged at least partially forward of the leading edge of a pair of wings and a set of EPUs are arranged at least partially rearward of the trailing edge of the pair of wings, and EPUs on opposite sides of the wings and opposite sides of the longitudinal axis 280 may be powered by the same battery pack so that minimal roll and pitch moments will occur in the event the battery pack fails (such as shown in FIG. 2A).

According to various embodiments, each battery pack 200 powers at least a portion of at least one proprotor 114 and at least a portion of at least one rotor 112. In the embodiment of FIG. 2A, rotors and proprotors at opposite positions are driven by the same battery pack 200. So, the outboard-most proprotor 114 on the left side of the fuselage 102 of the aircraft (EPU 1 in FIG. 2A) is powered by the same battery pack (battery pack 1 in FIG. 2A) as the outboard-most rotor 112 on the right side of the fuselage 102 (EPU 12). Similarly, the other pair of outboard-most EPUs (EPU 6 and EPU 7 in FIG. 2A) are powered by the same battery pack (battery pack 6). Groupings need not be limited to EPUs at exact opposite positions. For example, EPU 1 may be grouped with EPU 11 instead of EPU 12.

The number of EPUs powered by a given battery pack can be greater than two. For example, in some embodiments, the number of EPUs per battery pack can be three, four, five, six, or any other suitable portion of total number of EPUs. According to various embodiments, there can be different numbers of EPUs within each group. For example, one group can have two EPUs (two EPUs driven by a battery pack) while another group can have four EPUs (four EPUs driven by a different battery pack). The number of battery packs can be as few as two. In various embodiments, the number of battery packs is at least three, at least four, at least five, at least six, at least seven, at least eight, or higher.

Figure 2C:
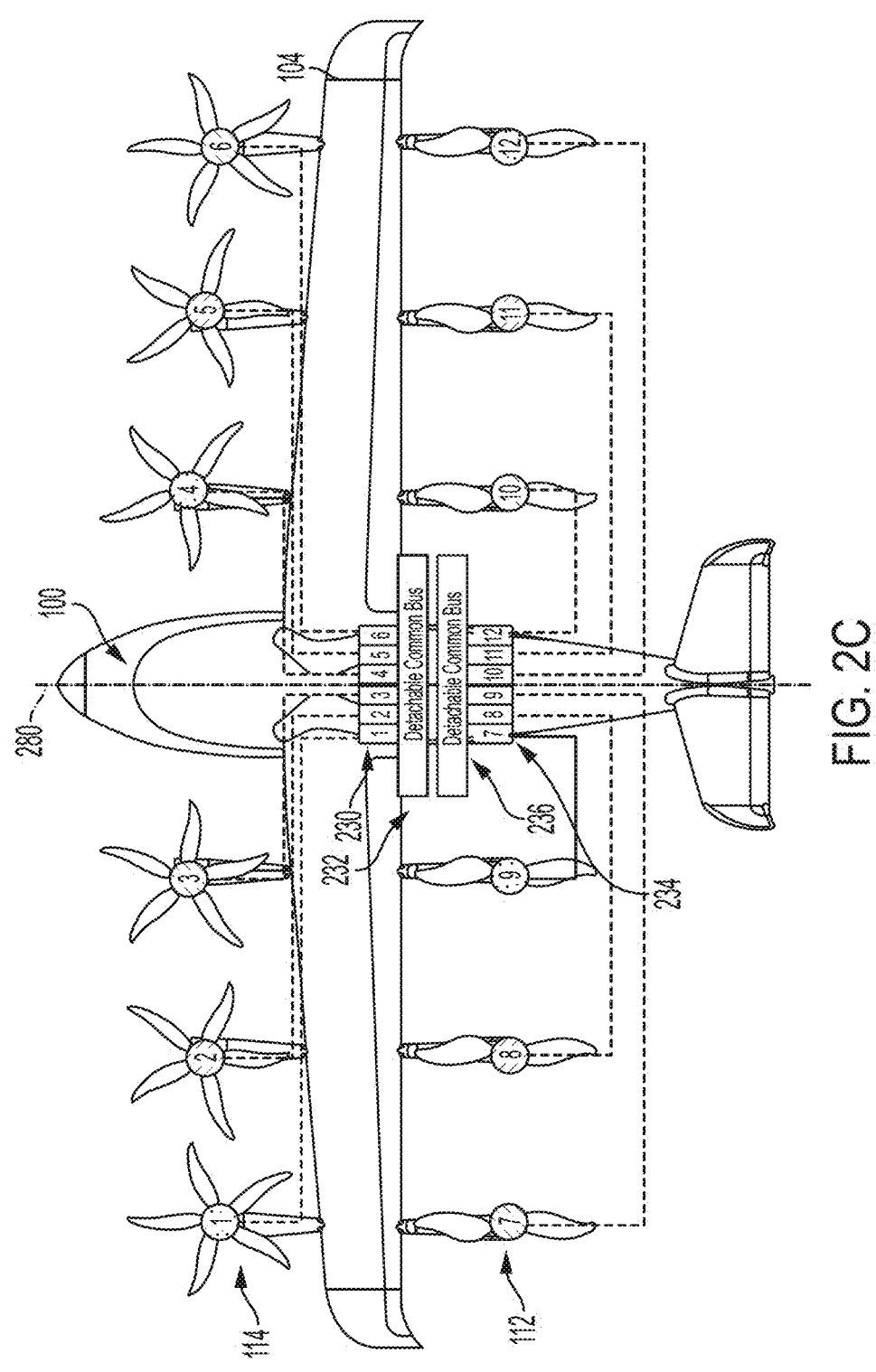
FIG. 2C illustrates a power distribution architecture for powering the electric propulsion units of an aircraft in which two sets of battery packs are detachably connected to two common buses, according to various embodiments.

FIG. 2C illustrates an embodiment in which the battery packs are arranged in sets that are isolated from one another. A first set 230 of battery packs (battery packs 1-6 in the illustrated embodiment) are interconnected via a first common bus 232 and a second set 234 of battery packs (battery packs 7-12 in the illustrated embodiment) are interconnected via a second common bus 236. The first and second common buses 232 and 236 are electrically isolated from one another such that there is no electrical connection between the first set 230 of battery packs and the second set 234 of battery packs.

According to various embodiments, each battery pack of the first set 230 of battery packs powers a proprotor 114 and each battery pack of the second set 234 of battery packs powers a rotor 112. According to some embodiments, the power requirements (e.g., peak power and/or power over the course of a flight) of the proprotors 114 and rotors 112 may be different and the battery packs of the first and second sets may be of different types and/or sizes based on the differences in power demands of the proprotors 114 and rotors 112. For example, in some embodiments, the proprotors 114 may be used during vertical flight and horizontal flight whereas the rotors 112 may only be used during vertical flight and, therefore, the total power required by the proprotors 114 over the course of a flight may be greater than the total power required by the rotors 112 over the course of the flight, and to accommodate this difference the battery packs of the first set 230 can be larger than the battery packs of the second set 234.

Figure 3:
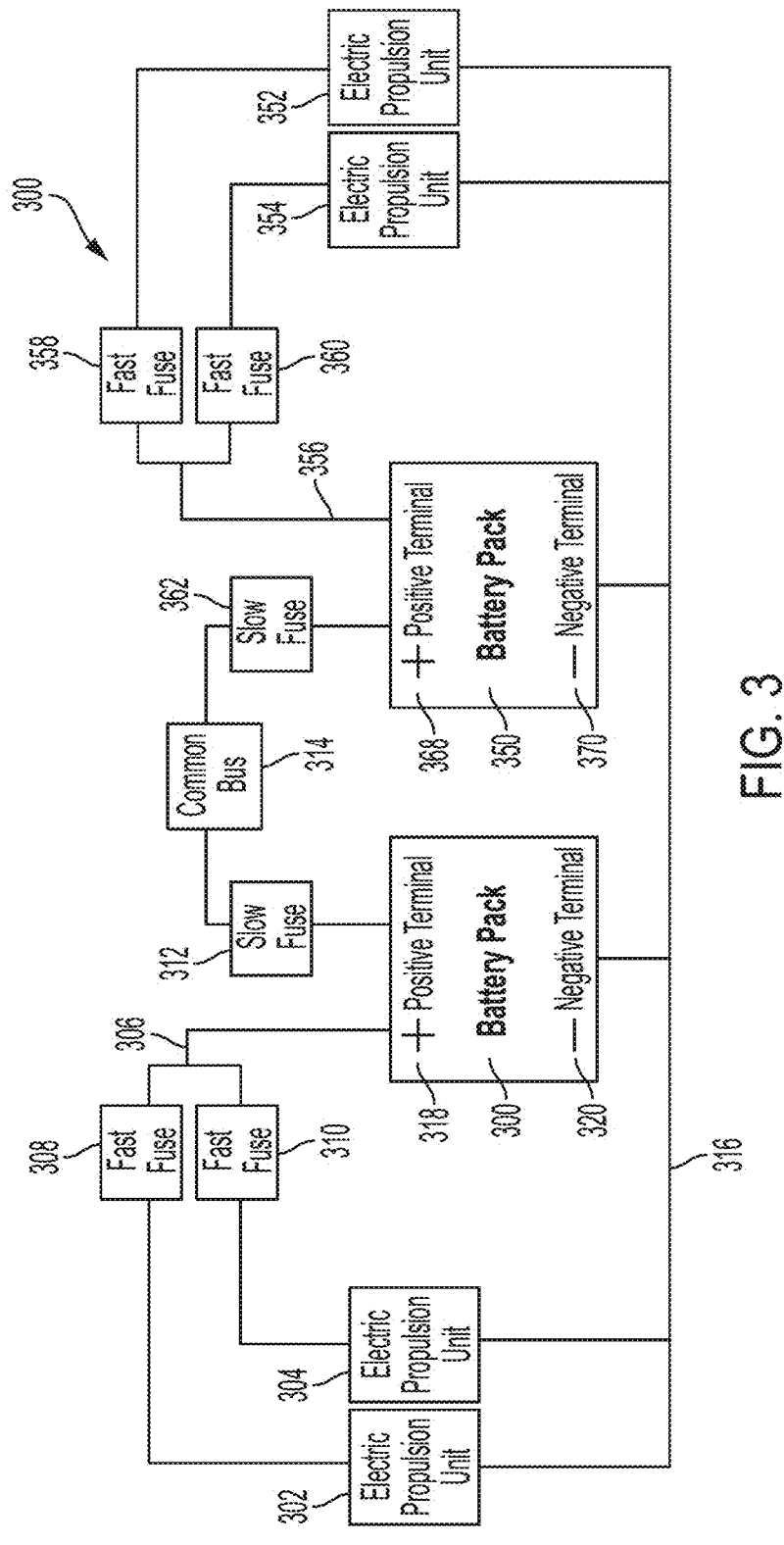
FIG. 3 is a block diagram of circuitry connecting two battery packs to each other and to a respective pair of electric propulsion units, according to various embodiments.

FIG. 3 is a block diagram of at least a portion of a power distribution system 300 of an electric aircraft. Two battery packs 300 and 350 are shown, with each battery pack configured being connected to two loads. However, it should be understood that the illustrated embodiment is merely exemplary and any number of battery packs may be used and can be connected to any number of loads, such as any number of EPUs and/or any number of portions of EPUs, as discussed above. In the illustrated embodiment, battery pack 300 is electrically connected to a pair of EPUs 302, 304. EPU 302 can be, for example, EPU 1 of FIG. 2A and EPU 304 can be, for example, EPU 12 of FIG. 2A. The battery pack 300 is connected to the EPUs 302, 304 via a power distribution bus 306. A first load electrical disconnection device 308 may be electrically positioned between the first battery pack 300 and EPU 302 to disconnect the first battery pack 300 from the EPU 302 in the event of an overcurrent fault event (e.g., a ground fault) associated with EPU 302 or a portion of the power distribution bus 306 downstream of electrical disconnection device 308. A second load electrical disconnection device 310 may be electrically positioned between the first battery pack 300 and EPU 304 to disconnect the first battery pack 300 from EPU 304 in the event of an overcurrent fault event associated with EPU 304 or a portion of the power distribution bus 306 downstream of electrical disconnection device 310.

First battery pack 300 is electrically connected to a common bus 314 to which second battery pack 350 is also electrically connected. Through the common bus 314, power can be shared amongst the first and second battery packs 300 and 350 (and any other battery packs that may be connected to the common bus 314). This can enable, for example, power to be supplied to EPU 302 and/or EPU 304 from both the first and second battery packs 300, 350.

A first common bus electrical disconnection device 312 is electrically positioned between the first battery pack 300 and the common bus 314 to disconnect the first battery pack 300 from the common bus 314 in the event of an overcurrent fault event. This can protect the first battery pack 300 from an overcurrent fault event associated with the common bus 314, which could be, for example, a ground fault involving the common bus 314 or a fault involving a battery pack connected to the common bus 314. The first common bus disconnection device 312 can also protect the common bus 314 from an overcurrent fault event involving the battery pack 300 itself.

According to various embodiments, the first common bus electrical disconnection device 312 is slower acting than the first and second load electrical disconnection devices 308 and 310. For example, in some embodiments, the common bus electrical disconnection device 312 may have a slower disconnection time (also referred to in the art as opening time or clearing time) at its rated current threshold than each of the first and second load electrical disconnection devices 308 and 310. Due to the different disconnection times, should an overcurrent fault occur on the power distribution bus 306, the EPU 302, and/or the EPU 304, that causes a current spike at the first and/or second disconnection devices 308, 310 that is above their rated currents and a current spike at the common bus electrical disconnection device 312 that is above its rated current, the first and/or second load electrical disconnection devices 308 and 310 will protect the battery pack 300 while the battery pack 300 remains connected to the common bus 314, because the first common bus electrical disconnection device 312 will not have disconnected due to it being slower acting than the first and/or second load electrical disconnection devices 308 and 310. In some embodiments, one or both of the load disconnection devices 308, 310 has a lower disconnection threshold current than the common bus disconnection device 312. For example, one or more load disconnection devices may have a 300 amp disconnection threshold and 140 ms disconnection time at its disconnection threshold current and the common bus fuse may have a 500 amp disconnection threshold and 360 ms disconnection time at its disconnection threshold current. In some embodiments, a load disconnection device has the same disconnection threshold as the common bus disconnection device 312. For example, the load and common bus disconnection devices can have 500 amp disconnection thresholds, with the load disconnection device having a 140 ms disconnection time at the threshold current and the common bus disconnection device having a 300 ms disconnection time at the threshold current.

According to various embodiments, the second battery pack 350 can be connected to EPUs 352 and 354 via power distribution bus 356. Third and fourth load electrical disconnection devices 358 and 360 may be electrically positioned between the second battery pack 350 and the EPUs 352 and 354 to disconnect the second battery pack from the EPUs during an overcurrent fault even, as discussed above with respect to the first battery pack 300 and EPUs 302 and 304. Second common bus electrical disconnection device 362 can be electrically positioned between the second battery pack 350 and the common bus 314. The second common bus electrical disconnection device 362 can be slower acting than each of the third and fourth load electrical disconnection devices 358 and 360, as discussed above with respect to first common bus disconnection device 312 and first and second load electrical disconnection devices 308 and 310.

According to various embodiments, the common bus electrical disconnection devices 312 and 362 that can disconnect the respective battery packs from the common bus 314 have the same disconnection current thresholds and/or the same disconnection times at their disconnection current threshold. In some embodiments, the first common bus electrical disconnection device 312 has a different disconnection threshold and/or opening time than the second common bus electrical disconnection device 362. In some embodiments, the disconnection current thresholds and/or opening times of the load electrical disconnection devices 308 and 310 are different from one another, such as due to different load requirements of the EPUs 302 and 304. In some embodiments, the disconnection current thresholds and/or opening times of one or both of the load electrical disconnection devices 308 and 310 are the same as the disconnection current thresholds and/or opening times of one or both of the load electrical disconnection devices 358 and 360.

Each of the electrical disconnection devices 308, 310, 312, 358, 360, and 362 can be any suitable electrical component for breaking the circuit in the event of an overcurrent fault event. For example, one or more of the electrical disconnection devices is a fuse, a breaker, or a switch operatively coupled to a current detector. According to some embodiments, each of the electrical disconnection devices 308, 310, 312, 358, 360 is a fuse. According to some embodiments, the electrical disconnection devices can be any suitable type of fuse or combination of types of fuses. For example, one or more of the electrical disconnection devices 308, 310, 312, 358, 360 is an explosive fuse, a thermal fuse, or a magnetic fuse. According to some embodiments, the common bus electrical disconnection devices are a first type of electrical disconnection device and the load electrical disconnection devices are a second type of electrical disconnection device that is different than the first type. For example, the load electrical disconnection devices 308 and 310 may be explosive fuses and the common bus electrical disconnection device 312 may be thermal fuses.

According to various embodiments, the disconnection current threshold of one or more of the load electrical disconnection devices 308, 310, 358, and 360 is at least 50 amps, at least 100 amps, at least 200 amps, at least 300 amps, or at least 500 amps. According to various embodiments, the disconnection current threshold of one or more of the load electrical disconnection devices 308, 310, 358, and 360 is at least 50 amps, at least 100 amps, at least 200 amps, at least 300 amps, or at least 500 amps. According to various embodiments, the disconnection current threshold of one or more of the common bus electrical disconnection devices 312, 362 is at least 100 amps, at least 200 amps, at least 300 amps, at least 400 amps, at least 500 amps, at least 600 amps, or at least 1000 amps. According to some embodiments, the disconnection current threshold of one or more of the common bus electrical disconnection devices is at least 10% higher, at least 20% higher, at least 30% higher, at least 50% higher, at least 66% higher, at least 75% higher, or at least 100% higher than the disconnection current threshold of one or more of the load electrical disconnection devices. According to various embodiments, the opening time of one or more of the load and/or common bus electrical disconnection devices at their rated current threshold is 1 second or less, 500 ms or less, 400 ms or less, 300 ms or less, 200 ms or less, 100 ms or less, 50 ms or less, or 10 ms or less. According to various embodiments, one or more load disconnection devices can have an opening time at its rated threshold current relative to the opening time of the common bus disconnection device at its rated threshold current that is at least 100 times faster, at least 50 times faster, at least 10 times faster, at least 5 times faster, or at least 2 times faster.

According to some embodiments, the negative terminals 320, 370 of battery packs 300, 350 are electrically connected to a common negative bus 316. According to some embodiments, the common bus 314 is electrically connected to the positive terminals 318, 368 of the battery packs 300, 350. According to various embodiments, the power distribution system 300 is free of diodes that control the flow of charge between the batteries 300, 350. According to various embodiments, this can make the power distribution system 300 more efficient relative to a system that include diodes, which can provide weight savings.

Figure 4:
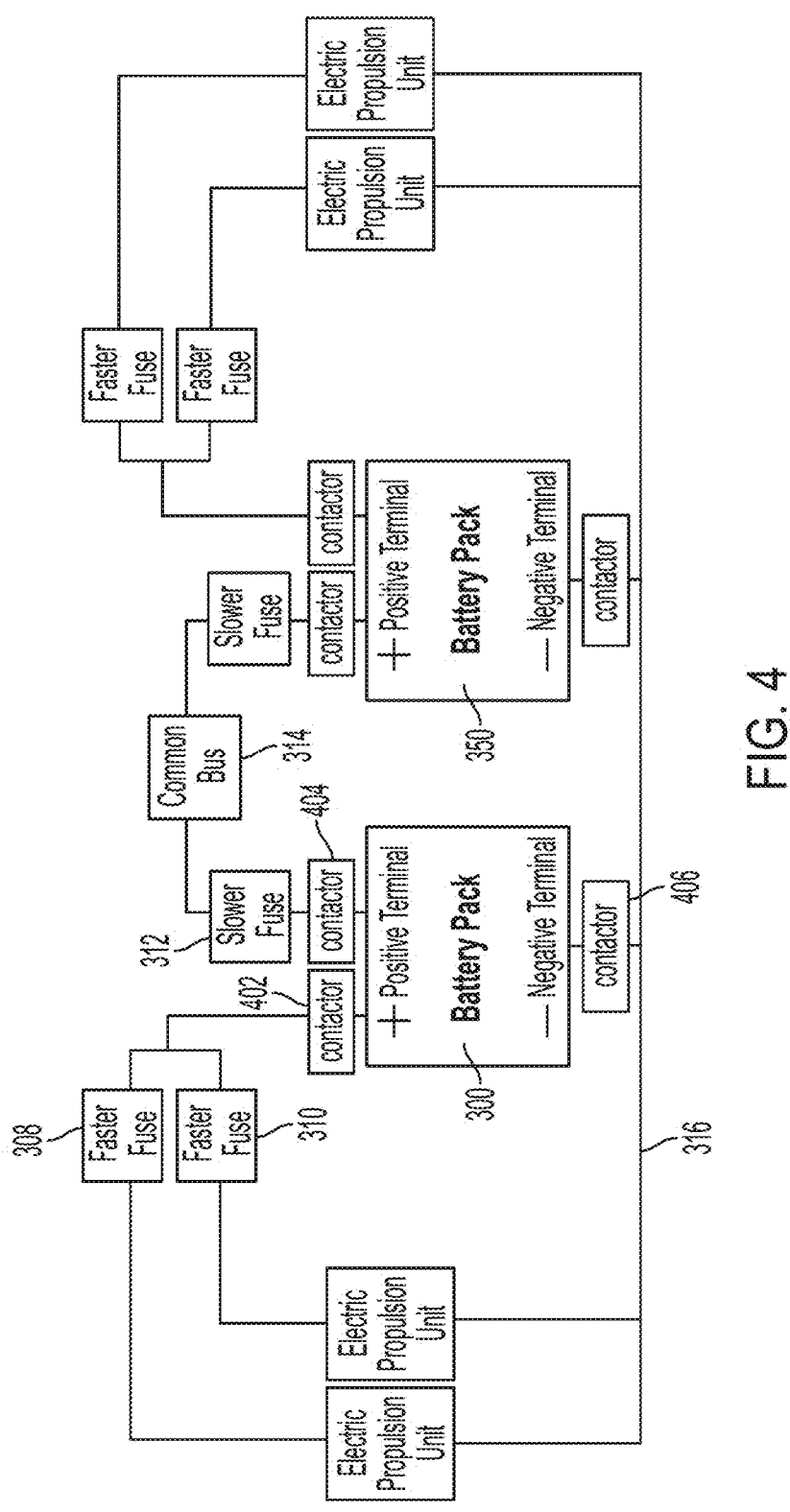
FIG. 4 is a block diagram of circuitry connecting two battery packs to each other and to a respective pair of electric propulsion units and including optional contactors, according to various embodiments.

According to various embodiment, the power distribution system 300 includes one or more contactors for selectively electrically disconnecting one or more portions of the power distribution system 300, such as during battery charging and/or to place the power distribution system in a safety mode after aircraft power down. FIGS. 4-8 illustrate various contactor arrangements, according to various embodiments. In FIG. 4, a contactor 402 is electrically positioned between the first battery pack 300 and the first and second load electrical disconnection devices 308, 310. A contactor 404 may optionally be electrically positioned between the first battery pack 300 and the first common bus electrical disconnection device 312. A contactor 406 may optionally be electrically positioned between the first battery pack 300 and the common negative bus 316. A similar contact arrangement can be used for the second battery pack 350 and will not be described separately for brevity (the same applies to the below-described variations).

Figure 5:
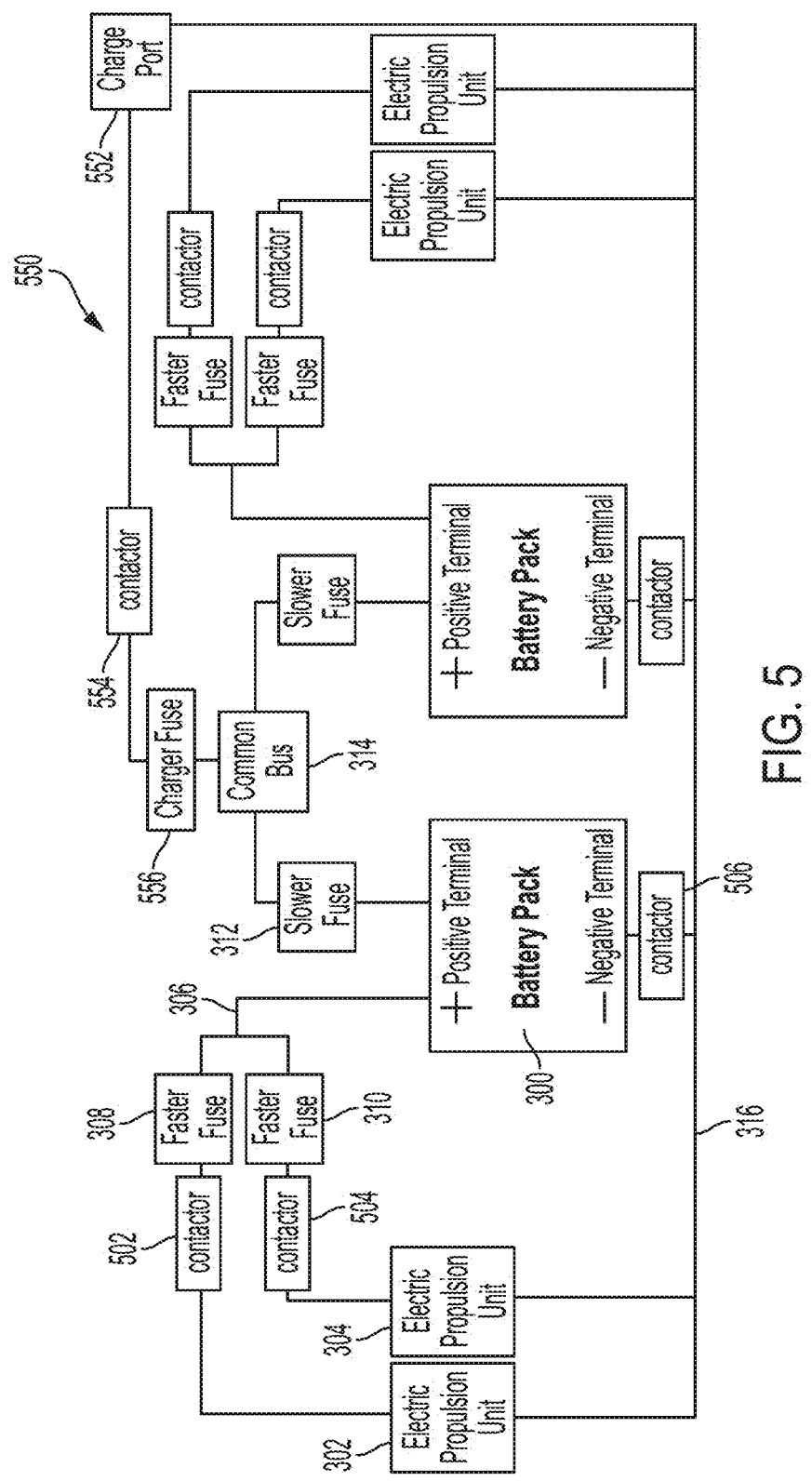
FIGS. 5-8 are block diagrams of various circuitry connecting two battery packs to each other and to a respective pair of electric propulsion units and including optional contactors and optional charging circuitry, according to various embodiments.
Figure 6:
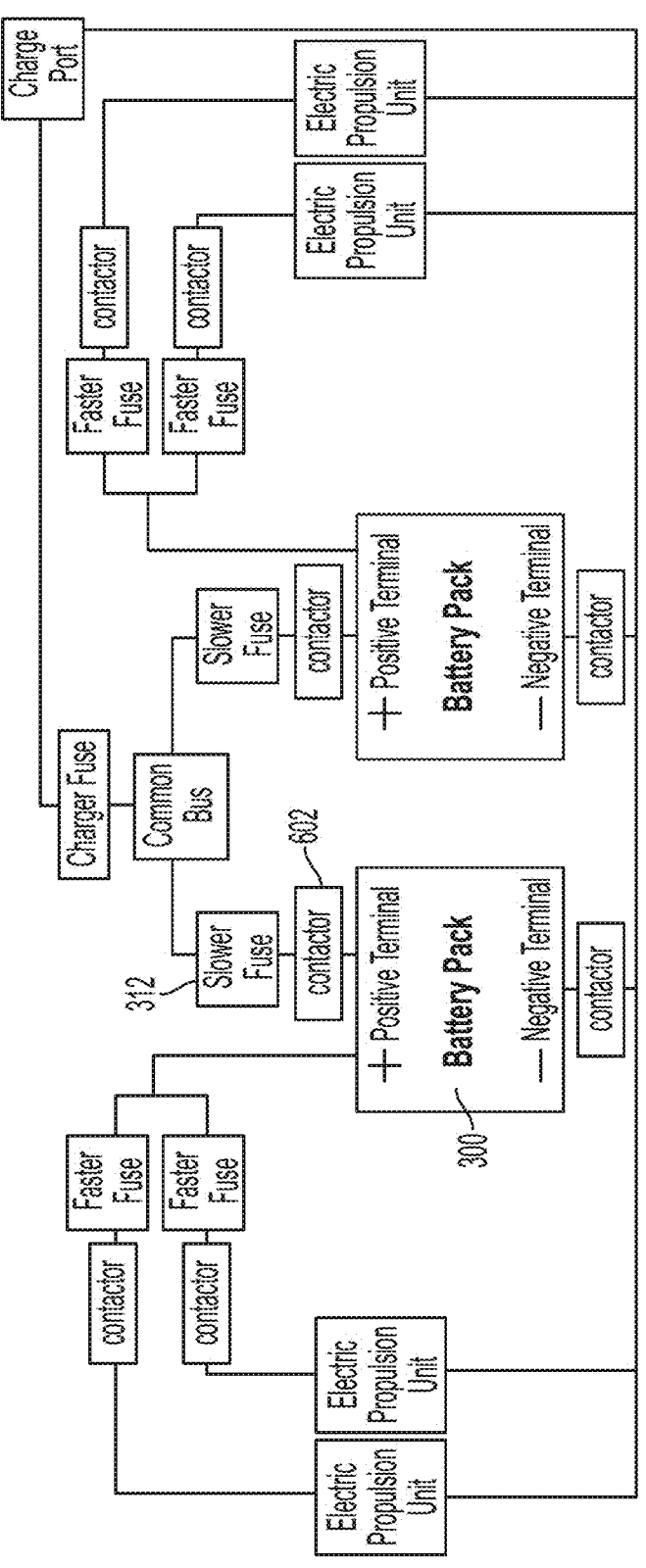

In FIG. 5, a contactor 502 is electrically positioned between the first load electrical disconnection device 308 and the EPU 302, a second contactor 504 is electrically positioned between the second load electrical disconnection device 310 and the EPU 304. A third contactor 506 is may optionally be electrically positioned between the first battery pack 300 and the common negative bus 316. FIG. 5 illustrates a charging circuit 550 for charging the battery packs 300 and 350, according to various embodiments. A charger port 552 can be used to connect an external charger to the power distribution system for charging. The charger port 552 may be connected to the common bus 314 and the common negative bus 316. A charger contactor 554 and charger fuse 556 may be positioned between the charger port 552 and the common bus 314. The embodiment of FIG. 6 is similar to that of FIG. 5 except that instead of the charger contactor 554, contactor 602 is provided between the common bus electrical disconnection device 312 and the battery pack 300.

Figure 7:
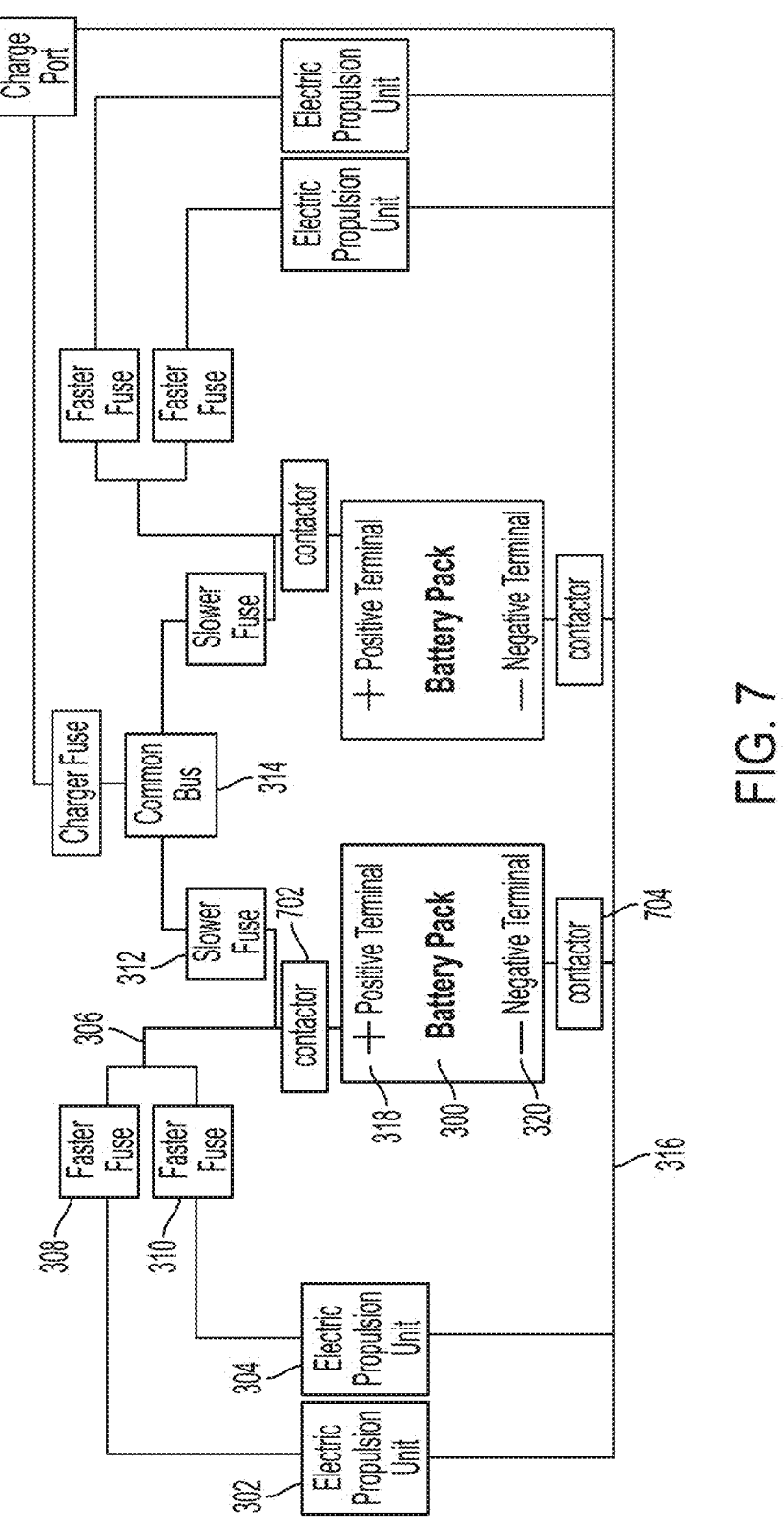
Figure 8:
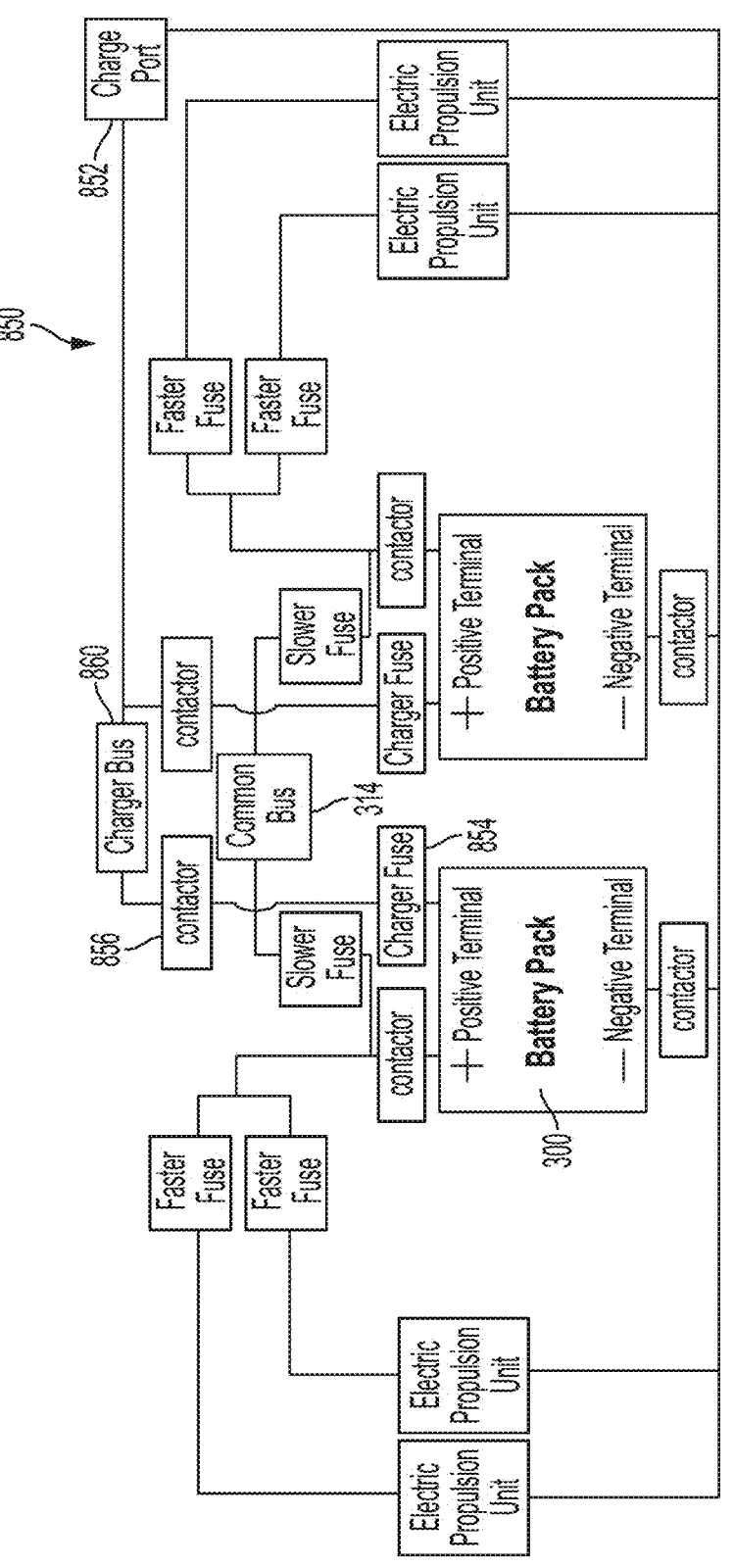

FIG. 7 illustrates an embodiment that has a minimal number of contactors for the arrangement of battery packs, loads, and charging circuit. A contactor 702 is located at the positive terminal 318 of the battery pack 300 for disconnecting the battery pack 300 from both the EPUs 302, 304 and the common bus 314. An optional contactor 704 can be positioned at the negative terminal 320 of the battery pack 300. The variation illustrated in FIG. 8 is similar to that of FIG. 7 except that the charging circuit 850 is directly connected to the battery pack 300, rather than to the common bus 314. The charger port 852 can lead to a charger bus 860. The battery pack 300 may be connected to the charger bus 860 with a charger fuse 854 and charger contactor 856 electrically positioned between the battery pack 300 and charger bus 860.

Figure 9:
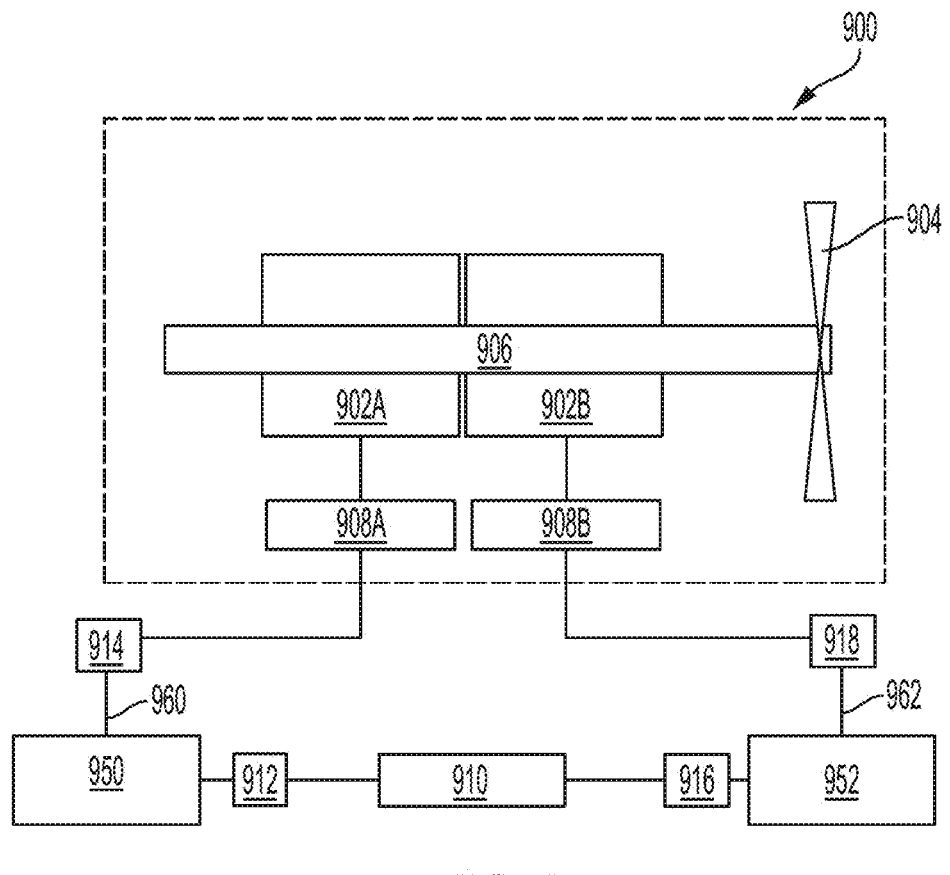
FIG. 9 is a block diagram of a portion of the power distribution to an electric propulsion unit that includes two partial motors, according to various embodiments.

In some embodiments, the EPUs or at least some of the EPUs include multiple motor stages that are each independently powered by different battery packs so that should one battery pack fail only a portion of the EPU is unpowered and the EPU can continue operating at a reduced power level. FIG. 9 is a block diagram of a portion of the power distribution to an EPU 900 that includes two partial motors—902A and 902B. The EPU 900 can be a rotor, such as rotor 112 of FIG. 1A, or a proprotor, such as proprotor 114 of FIG. 1A. The two partial motors 902A and 902B can operate independently to drive fan blades 904 via shaft 906 and can operate simultaneously to drive the fan blades 904 at higher power. The partial motors 902A and 902B are driven by their own motor controllers 908A and 908B, respectively. Partial motor 902A and motor controller 908A are powered by battery pack 950 via power distribution bus 960, while partial motor 902B and motor controller 908B are powered by battery pack 952 via power distribution bus 962. The battery packs 950 and 952 are electrically connected to one another via common bus 910, which is detachable from each of the battery packs 950, 952 via common bus electrical disconnection devices 912 and 916, according to the principles discussed above, such that in the event of an overcurrent fault event at the common bus 910, the partial motor 902A, motor controller 908A, distribution bus 960, and battery pack 950 are electrically isolated from partial motor 902B, motor controller 908B, distribution bus 962, and battery pack 952. Therefore, an electrical fault affecting the common bus 910 and/or the first partial motor 902A does not affect the second partial motor 902B and vice versa. Thus, the EPU 900 can continue to operate, albeit at reduced power, in the event that the common bus 910 and/or one of the battery packs 950 or 952 should fail. Further, in accordance with the principles discussed above, load electrical disconnection devices 914, 918 protect the corresponding battery packs 950, 952 from overcurrent faults at the associated partial motors, motor controllers, and power distribution buses.

According to various embodiments, a battery pack can drive partial motors of oppositely arranged EPUs. For example, looking at FIG. 2A, first battery pack 1 can power a first partial motor of EPU 1, a first partial motor of EPU 12, a first partial motor of EPU 6, and a first partial motor of EPU 7. Thus, in the event of a failure of battery pack 1, both the rotors and proprotors at the same relative position on the opposite sides of the airplane will lose at least half of their maximum available power but will still be operational.

The battery packs for powering the EPUs can be located in any suitable locations of the aircraft, including in the fuselage and/or the wings. The number and power of the EPUs can be selected according to the desired performance parameters (e.g., target payload, airspeed, and altitude). According to various embodiments, the maximum power rating of one or more of the EPUs is 500 kilowatts or less, preferably 200 kilowatts or less, more preferably 150 kilowatts or less. According to some embodiments, the maximum power rating of one or more of the EPUs is at least 10 kilowatts, preferably at least 20 kilowatts, more preferably, at least 50 kilowatts. The aircraft can have an equal number of rotors and proprotors, a greater number of proprotors, or a greater number of rotors.

According to various embodiments, each battery pack is configured for a maximum stored energy of at least 1 kilowatt-hour or preferably at least 10 kilowatt-hours, and/or a maximum stored energy of at most 200 kilowatt-hours, preferably at most 100 kilowatt-hours, preferably at most 75 kilowatt-hours, more preferably at most 50 kilowatt-hours. According to various embodiments, the battery packs are configured so that their collective maximum stored energy is at least 1 kilowatt-hour or preferably at least 10 kilowatt-hours, and/or their maximum stored energy is at most 200 kilowatt-hours, preferably at most 100 kilowatt-hours, preferably at most 75 kilowatt-hours, or more preferably at most 50 kilowatt-hours. According to various embodiments, at least some of the battery packs at full charge provide a voltage of at least 100 volts, at least 500 volts, or at least 1000 volts. According to various embodiments, at least some of the battery packs at full charge provide at most 2000 volts, at most 1500 volts, at most 1000 volts, or at most 500 volts. According to some embodiments, nominal maximum voltage is between 500 and 1000 volts, preferably between 600 and 800 volts, or more preferably between 650 and 750 volts.

According to various embodiments, the EPUs are sized to accommodate a loss of a portion of the EPUs due to a battery pack failure in accordance with the principles discussed above. For example, should two EPUs be lost due to a failure in the battery pack driving the two EPUs, the remaining EPUs and the associated battery packs may be sufficiently sized to provide additional thrust to at least partially make up for the thrust lost from the disabled EPUs.

Aircraft according to the principles discussed above can be configured to carry at least one person and up to 10 people, preferably up to 6 people, and more preferably up to 4 people. According to some embodiments, the aircraft is configured to be piloted and includes piloting controls. In some embodiments, the aircraft is configured to operate autonomously without any onboard pilot and with or without one or more passengers.

According to some embodiments, the aircraft is configured to carry up to 6 people (for example, a pilot and up to 5 passengers) up to 75 miles at a cruising speed of up to 150 miles per hour at an altitude of up to 3,000 feet above ground. In some embodiments, the aircraft is configured for 5 people, such as one pilot and four passengers. According to various embodiments, the maximum range on a single battery charge is 25 miles, 50 miles, 75 miles, 100 miles, or 200 miles.

According to various embodiments, the rotors 112 and/or proprotors 114 are configured to have relatively low tip speed to decrease the amount of noise generated by the aircraft. In some embodiments, the tip speed of the rotor blades is about 0.4 Mach in hover. According to various embodiments, the diameter of the rotor and/or proprotor blades is the range of 1 to 5 meters, preferably in the range of 1.5 to 2 meters.

According to various embodiments, the wingspan is in the range of 10 to 20 meters, preferably in the range of 15 to 16 meters. According to various embodiments, the length of the aircraft is in the range of 3 to 20 meters, preferably in the range of 5 to 15 meters, more preferably in the range of 6 to 10 meters.

According to various embodiments, the aircraft is operated during take-off and landing by positioning the proprotors in lift configurations and providing the required lift to the aircraft via the combined lift provided by the rotors and proprotors. According to various embodiments, during vertical take-off and landing and/or hover, the proprotors can be maintained in predetermined lift configurations that can be the same across all proprotors or different for different proprotors. According to various embodiments, the tilt of at least some of the proprotors can be actively adjusted during take-off and landing and/or hover to provide the required stability and/or maneuvering. According to some embodiments, the tilt of at least one proprotor is actively controlled by the flight controller during take-off, landing, and/or hover to generate yawing moments.

According to various embodiments, each rotor and/or each proprotor can be individually controlled by the flight controller according to the various operational degrees of freedom. According to various embodiments, the only degree of freedom of the rotor is the rotational speed of the rotor. In some embodiments, the angle of attack of the blades of the rotors can be collectively adjusted, providing an additional degree of freedom. According to various embodiments, the degrees of freedom of at least a portion of the proprotors includes the rotational speed of the proprotors, the collective attack angle of the blades, and the degree of tilt of the proprotors. According to various embodiments, any of these degrees of freedom can be actively controlled by the flight controller (either autonomously or in response to pilot commands) during take-off and landing in order to provide the appropriate stability and maneuvering.

Once the aircraft has achieved sufficient altitude to commence forward flight, the proprotors begin tilting forward toward their propulsion configurations such that their thrust provides a combination of lift and thrust, with a decreasing proportion of lift as the proprotors are tilted further toward their propulsion configurations. The rotors can remain active during at least a portion of the period in which the proprotors are tilted forward to continue to provide rotor-based lift. At any point after the forward airspeed is high enough that the wings provides sufficient lift to maintain the aircraft's altitude, the rotors can be deactivated. As discussed above, the rotor blades can be locked in a low-drag position.

During cruising, the rotors remain deactivated. The control surfaces of the wings and/or rear stabilizers can be used for aircraft maneuvering and stability in a conventional manner. According to some embodiments, should a battery pack be lost during forward flight, resulting in the loss of the power provided by the portion of the proprotors powered by the lost battery pack, the aircraft can compensate via use of the control surfaces and/or via adjustment in power from the unaffected portion of the proprotors.

According to some embodiments, the tilt of at least some of the proprotors can be actively controlled to provide additional stability and/or maneuverability control. In some embodiments, the tilt of at least some of the proprotors is actively controlled during take-off and landing and/or hover. In some embodiments, the tilt of the proprotors is fixed (i.e., non-varying) during cruise. According to some embodiments, the tilt of the outermost proprotors can be actively and independently controlled during vertical take-off and landing and/or hover to provide yawing moments as needed.

According to various embodiments, the EPUs (rotors and proprotors) can be powered according to the power distribution architecture described herein. For example, a method for powering an aircraft includes powering, by a first battery pack, a first plurality of electric propulsion units mounted to at least one wing of the aircraft and positioned at least partially forward of a leading edge of the at least one wing via a first electric power bus electrically connecting the first battery pack to the at least a portion of the first electric propulsion unit of the first plurality of electric propulsion units and the at least a portion of the first electric propulsion unit of the second plurality of electric propulsion units. The method also includes powering, by a second battery pack, a second plurality of electric propulsion units mounted to the at least one wing and positioned at least partially rearward of a trailing edge of the at least one wing via a second electric power bus electrically connecting the second battery pack to the at least a portion of the second electric propulsion unit of the first plurality of electric propulsion units and the at least a portion of the second electric propulsion unit of the second plurality of electric propulsion units, wherein the second electric power bus is electrically isolated from the first electric power bus.

According to various embodiments, a method for powering an aircraft includes powering, by a first battery pack, at least a portion of a first rotor and at least a portion of a first proprotor via a first electric power bus electrically connecting the first battery pack to the at least a portion of the first rotor and the at least a portion of the first proprotor. The method also includes powering, by a second battery pack, at least a portion of a second rotor and at least a portion of a second proprotor via a second electric power bus electrically connecting the second battery pack to the at least a portion of the second rotor and the at least a portion of the second proprotor, wherein the second electric power bus is electrically isolated from the first electric power bus.

According to various embodiments, should a battery pack or power distribution for that battery pack fail during flight-such as during vertical take-off or landing, hover, or forward flight-only the EPUs powered by that battery pack are disabled. The remaining EPUs-those powered by other battery packs that are electrically isolated from the disabled battery pack-continue to operate. According to various embodiments, the power of at least a portion of the unaffected EPUs may be increased to compensate for the loss of the thrust of the disabled EPUs.

According to various embodiments, the battery packs power different motor portions of the same EPU such that in the event of loss of one of the battery packs or its power distribution the affected EPUs can continue to operate at reduced power. According to various embodiments, the power of the unaffected motor portion can be increased and/or the power of the unaffected EPUs can be increased to compensate for the loss of thrust from the disabled motor portions.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. An electric aircraft, comprising:
a fuselage;
two fixed wings mounted on opposite sides of the fuselage;
a first set of one or more electric propulsion units (EPUs) and a second set of one or more EPUs disposed on one side of the fuselage, wherein the first set is disposed forward of the second set;
a third set of one or more EPUs and a fourth set of one or more EPUs disposed on another side of the fuselage, wherein the third set is disposed forward of the fourth set; and
a plurality of battery packs, wherein each battery pack of the plurality of battery packs is configured to power at least:
a portion of at least one EPU of the first set of one or more EPUs and a portion of at least one EPU of the fourth set of one or more EPUs, or a portion of at least one EPU of the second set of one or more EPUs and a portion of at least one EPU of the third set of one or more EPUs,
wherein each battery pack is configured to power a respective portion of an EPU via a different dedicated electric power bus, and
wherein at least one battery pack is connected to at least one EPU via at least one of a contactor or a fuse.

2. The electric aircraft of claim 1, wherein:
at least two battery packs are connected to a common bus via at least one of a contactor or a fuse, and
the common bus connects positive terminals of the at least two battery packs.

3. The electric aircraft of claim 1, wherein at least two battery packs are connected to a common bus via at least one of a contactor or a fuse and configured to power different EPUs.

4. The electric aircraft of claim 3, wherein the different EPUs are of different sets of one or more EPUs.

5. The electric aircraft of claim 1, wherein at least two battery packs are connected to a common bus via at least one of a contactor or a fuse and configured to power different portions of one of the EPUs.

6. The electric aircraft of claim 1, wherein the portion of at least one EPU is a partial motor.

7. The electric aircraft of claim 1, wherein at least one of the plurality of battery packs is configured to power at least:
a portion of one EPU of the first set of one or more EPUs and a portion of one EPU of the fourth set of one or more EPUs, both EPUs disposed farthest from the fuselage relative to their respective sets; or
a portion of one EPU of the second set of one or more EPUs and a portion of one EPU of the third set of one or more EPUs, both EPUs disposed farthest from the fuselage relative to their respective sets.

8. The electric aircraft of claim 1, wherein at least one of the plurality of battery packs is configured to power at least:
a portion of one EPU of the first set of one or more EPUs and a portion of one EPU of the fourth set of one or more EPUs, both EPUs disposed nearest to the fuselage relative to their respective sets; or
a portion of one EPU of the second set of one or more EPUs and a portion of one EPU of the third set of one or more EPUs, both EPUs disposed nearest to the fuselage relative to their respective sets.

9. The electric aircraft of claim 1, wherein at least one of the plurality of battery packs is configured to power at least:
(i) a portion of one EPU that is in the first set of one or more EPUs and is arranged between a nearest-from-the-fuselage disposed EPU and a farthest-from-the-fuselage disposed EPU in the first set of one or more EPUs, and (ii) a portion of one EPU that is in the fourth set of one or more EPUs and is arranged between a nearest-from-the-fuselage disposed EPU and a farthest-from-the-fuselage disposed EPU in the fourth set of one or more EPUs; or
(iii) a portion of one EPU that is in the second set of one or more EPUs and is arranged between a nearest-from-the-fuselage disposed EPU and a farthest-from-the-fuselage disposed EPU in the second set of one or more EPUs, and (iv) a portion of one EPU that is in the third set of one or more EPUs and is arranged between a nearest-from-the-fuselage disposed EPU and a farthest-from-the-fuselage disposed EPU in the third set of one or more EPUs.

10. The electric aircraft of claim 1, wherein each dedicated electric power bus is electrically isolated from another dedicated electric power bus.

11. The electric aircraft of any of claim 1, wherein no two battery packs of the plurality of battery packs power a same portion of any EPU of the aircraft.

12. The electric aircraft of claim 1, wherein:

at least two battery packs are connected to a common bus via at least one of a contactor or a fuse, and each EPU of the first set of one or more EPUs and each EPU of the fourth set of one or more EPUs is powered by only one of the at least two battery packs.

13. The electric aircraft of claim 1, wherein:

at least two battery packs are connected to a common bus via at least one of a contactor or a fuse, and each EPU of the second set of one or more EPUs and each EPU of the third set of one or more EPUs is powered by only one of the at least two battery packs.

14. The electric aircraft of claim 1, wherein the first set of one or more EPUs and the third set of one or more EPUs are configured to provide lift.

15. The electric aircraft of claim 1, wherein the second set of one or more EPUs and the fourth set of one or more EPUs are configured to provide lift.

16. The electric aircraft of claim 1, wherein the first set of one or more EPUs and the third set of one or more EPUs are tiltable between vertical lift and forward propulsion configurations.

17. The electric aircraft of claim 1, wherein the second set of one or more EPUs and the fourth set of one or more EPUs are tiltable between vertical lift and forward propulsion configurations.

18. The electric aircraft of claim 1, wherein each set of one or more EPUs includes three EPUs.

19. An electric aircraft, comprising:

a fuselage;

a first set of one or more electric propulsion units (EPUs) and a second set of one or more EPUs, both disposed on one side of the fuselage, wherein the first set is disposed forward of the second set;

a third set of one or more EPUs and a fourth set of one or more EPUs, both disposed on another side of the fuselage, wherein the third set is disposed forward of the fourth set;

a plurality of battery packs, each battery pack configured to power at least:

a portion of at least one of the first set of one or more EPUs and a portion of at least one of the fourth set of EPUs, or a portion of at least one of the second set of one or more EPUs and a portion of at least one of the third set of EPUs; and a charger port configured for connection to an external charger for charging at least two battery packs of the plurality of battery packs, wherein the at least two battery packs are connected to the charger port via at least one of a contactor or a fuse.

20. The electric aircraft of claim 19, wherein each of the at least two battery packs is connected to the charger port via at least one of a contactor or a fuse.

21. The electric aircraft of claim 19, wherein the at least two battery packs are configured to power different EPUs.

22. The electric aircraft of claim 21, wherein the at least two battery packs are configured to power different EPUs from different sets of EPUs.

23. The electric aircraft of claim 19, wherein at least two of the plurality of battery packs each power different portions of one EPU.

24. The electric aircraft of claim 19, wherein at least two of the plurality of battery packs each power a partial motor associated with a different EPU.

25. The electric aircraft of claim 19, wherein each battery pack is configured to power a portion of an EPU via a dedicated electric power bus.

26. The electric aircraft of claim 19, wherein the first set of one or more EPUs and the third set of one or more EPUs are configured to provide lift.

27. The electric aircraft of claim 19, wherein the second set of one or more EPUs and the fourth set of one or more EPUs are configured to provide lift.

28. The electric aircraft of claim 19, wherein the first set of one or more EPUs and the third set of one or more EPUs are tiltable between vertical lift and forward propulsion configuration.

29. The electric aircraft of claim 19, wherein the second set of one or more EPUs and the fourth set of one or more EPUs are tiltable between vertical lift and forward propulsion configuration.

30. The electric aircraft of claim 19, wherein at least one battery pack is configured to power at least:

a portion of at least one of the first set of one or more EPUs and a portion of at least one of the third set of EPUs.

31. The electric aircraft of claim 19, wherein at least one battery pack is configured to power at least:

a portion of at least one of the second set of one or more EPUs and a portion of at least one of the fourth set of EPUs.

32. The electric aircraft of claim 19, wherein:

a first battery pack of the at least two battery packs is connected to the charger port via at least one of a first contactor or a first fuse, and a second battery pack of the at least two battery packs is connected to the charger port via at least one of a second contactor or a second fuse.

* * * * *